April 11, 1967 L. T. FUQUA 3,313,077
MIRROR SUPPORT

Filed April 16, 1963 2 Sheets-Sheet 1

INVENTOR.
Lloyd T. Fuqua
BY
W. F. Wagner
ATTORNEY

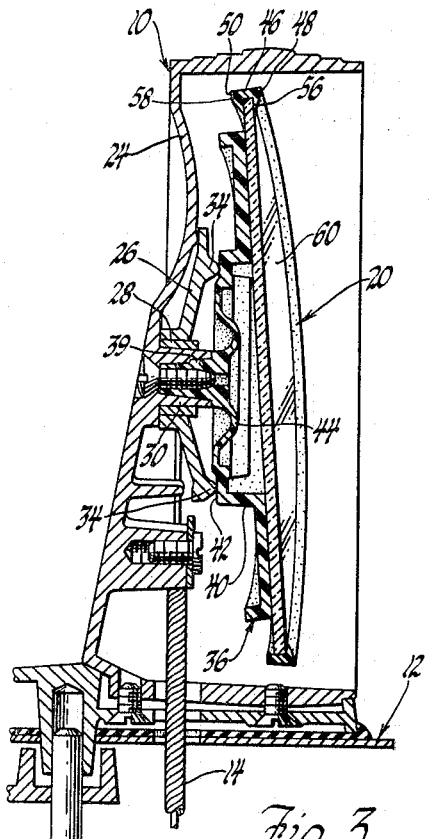
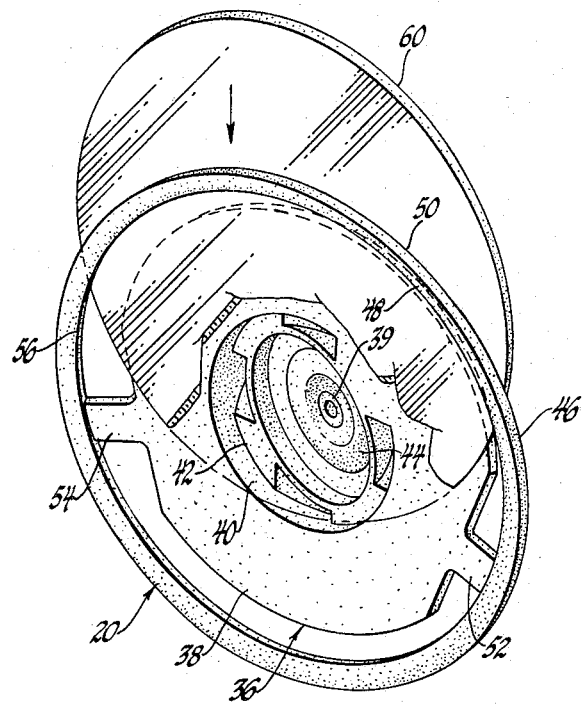
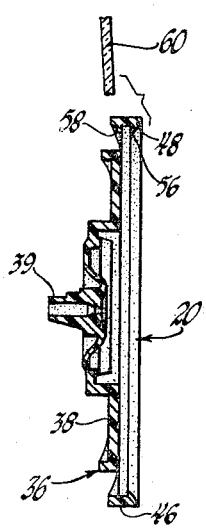
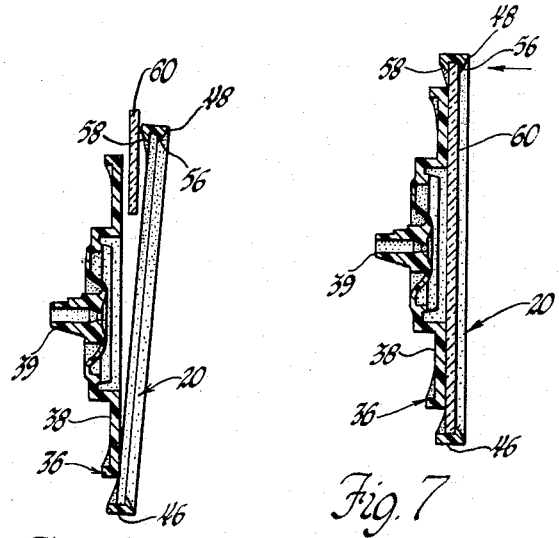

United States Patent Office 3,313,077
Patented Apr. 11, 1967

3,313,077
MIRROR SUPPORT
Lloyd T. Fuqua, Fortville, Ind., assignor to General Motors Corporation, Detroit, Mich., a corporation of Delaware
Filed Apr. 16, 1963, Ser. No. 273,519
4 Claims. (Cl. 52—615)

This invention concerns a mirror support adapted to be adjustably mounted on a motor vehicle for supporting a mirror element.

Most mirror supports presently utilized in rear view mirror constructions comprise a casing having an outer configuration conforming to the shape of the mirror element. In assembling a mirror support of this type the reflective mirror element is usually mounted in the casing and the marginal part of the latter is deformed radially inwardly so as to form a bezel that embraces the beveled edge of the mirror element to retain it within the casing. As should be apparent, an assembly operation of this sort requires special machinery to form the bezel around the mirror element. Aside from the difficulty in assembly, it has been found that it is impossible to replace the mirror element in constructions of this sort without marring or damaging the casing to the extent that its usefulness as a mirror support becomes impaired.

The present invention alleviates the above-mentioned problems by providing a mirror support constructed in a manner that facilitates assembly of the mirror element thereto and permits the removal of the latter without damaging the support. Broadly stated, this is accomplished by a mirror support comprising a body portion having the rear thereof formed with connecting means that are adapted to mount the mirror support to a base. A rim is radially spaced from the body portion and connected thereto by flexible means which are located at points that permit the rim to be displaced relative to the body portion so that a mirror element can be inserted and retained between a flange formed on the rim and the body portion.

A more complete understanding of this invention will be obtained from the following detailed description taken in conjunction with the drawings in which:

FIGURE 3 is a sectional view taken on lines 3—3 of FIGURE 2;

FIGURE 4 is an isometric view showing the mirror support employed with the mirror mechanism of FIGURES 1-3 and made in accordance with the invention;

FIGURES 5, 6 and 7 are elevation side views showing the relative position of the various portions of the mirror support during the assembly of the mirror element thereto.

Figure 1:
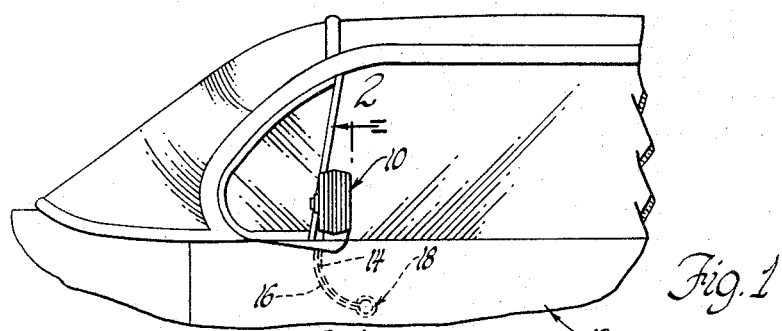
FIGURE 1 is a fragmentary side view of a motor vehicle having a mirror mechanism of a type with which the present invention can be incorporated.
Figure 2:
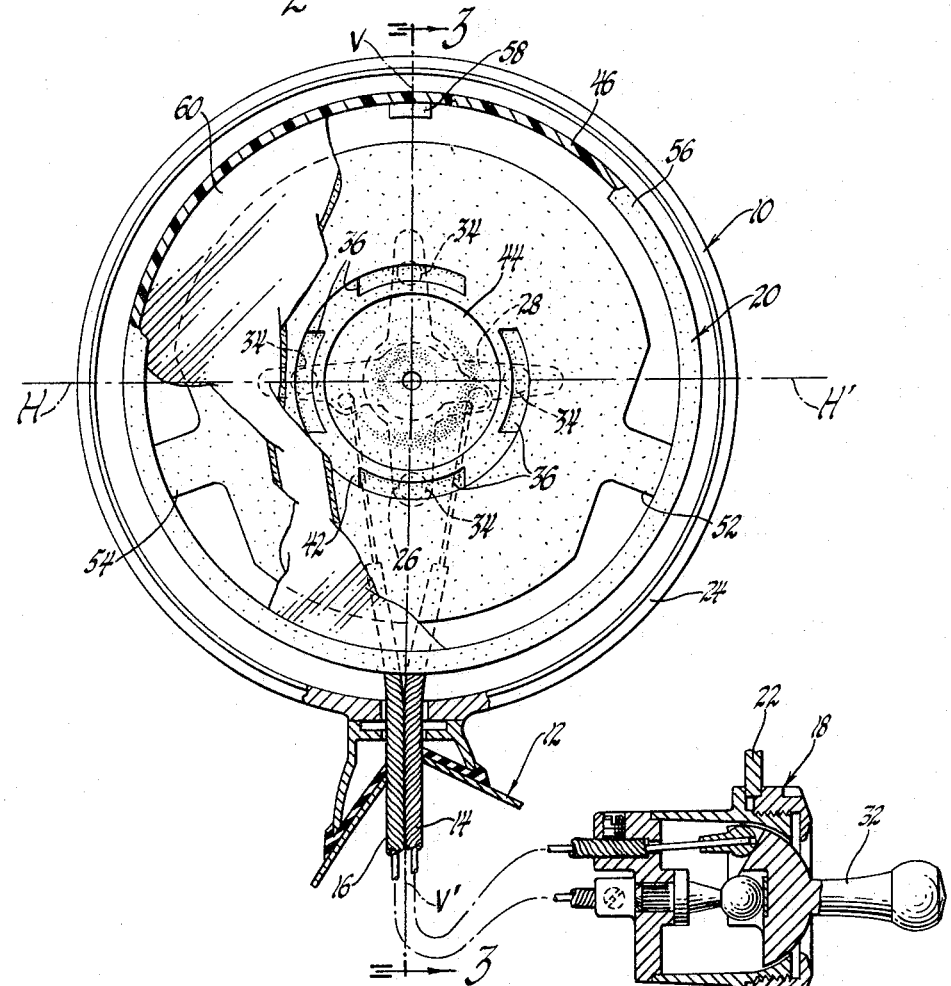
FIGURE 2 is an enlarged view taken on lines 2—2 of the mirror mechanism of FIGURE 1 with some parts broken away and others sectioned so as to clearly reveal the various components of the construction.

Referring now to the drawings and specifically FIGURES 1 through 3 thereof, a rear view mirror mechanism generally indicated by the numeral 10 is shown mounted exteriorly to the outer sheet metal of a vehicle door 12. A pair of cables 14 and 16, that comprise the usual wire and sheath portion and act in tension and compression, are each mounted at one end within the mirror mechanism while the other ends are connected to an actuator generally indicated by the numeral 18. As should be apparent, the mirror mechanism illustrated is of the remotely controlled type which permits a mirror support 20 to be adjusted by the vehicle driver from within the vehicle. In this regard, and as best seen in FIGURE 2, the actuator is fixed to the trim panel 22 of the door within readily accessible reach of the driver. A mirror mechanism similar to that disclosed in the drawings is found in copending patent application A-2144 in the names of Lloyd T. Fuqua, George C. Campbell and Lucien W. Pryor and assigned to the assignee of this invention. Reference is made to that application for a detailed description and explanation of the operation of this device; however, for present purposes it should suffice to mention that this mechanism includes a housing or base 24 for the mirror support 20 and that adjustment of the latter is accomplished through a pair of cam support members 26 and 28 that are rotatably mounted on a boss 30 and have oppositely extending arms formed therewith. The cam support members are connected through the cables 14 and 16 to a universally supported control knob 32 so that upon pivotal movement of the latter either selective or cojoint movement of the cables is realized, which in turn, causes one or both of the cam support members to rotate about the axis of the boss 30. A cone-type projection 34, formed with each arm of the respective cam support members, engages one of four ramp portions 36 integrally formed with the rear of the mirror support. As best seen in FIGURE 2, each ramp portion is arcuate in form and located on a circle so that upon rotative movement of, for example, the cam support member 26, the projection on one arm thereof rides up a ramp while the other projection rides down the other ramp, resulting in tilting movement of the mirror support about a horizontal axis H–H'. Similarly when the cam support member 28 is rotated, sidewise movement of the mirror support about a vertical axis V–V' is realized. Finally, when both cam support members are rotated simultaneously, tilting movement of the mirror support occurs about an axis located in the same plane as the axes V–V' and H–H' but therebetween.

With reference to FIGURE 4, the mirror support 20 utilized with the above-described mirror mechanism, and which constitutes the invention in this case, comprises a plastic body portion 36 of a generally circular outer form provided with a flat annular bearing surface 38 on the front face thereof which integrally connects with an axially extending ring portion 40 that is tapered from its widest to its narrowest point along the H–H' axis to permit the face of the mirror support to normally face the driver. The ring portion leads into a radially inwardly extending portion 42, the rear of which is formed with the aforementioned ramps. A thin annular diaphragm 44 conects the body portion 36 with a stud 39 that is centrally located with respect to the ramps and the marginal edge of the body portion. As best seen in FIGURE 3, the stud is accommodated by a bore in the boss 30 and is rigidly secured therein so as to retain the ramps on the mirror support in contact with the projections 34. On the other hand, the flexibility of the diaphragm permits the mirror support to tilt in response to movement of the cam support members as described above and thereby eliminates the need for the usual ball-and-socket connection frequently employed for universally pivotally supporting a mirror support.

The mirror support also includes an annular rim 46 terminating at opposite ends thereof with a front and rear edge 48 and 50, respectively, both of which are located in plane that are substantially parallel to the bearing surface 38. The rim is concentrically located in radially spaced relationship with respect to the marginal edge of body portion 36 and has the portion adjacent the rear edge thereof connected to a pair of struts 52 and 54 which extend radially outwardly from the body portion. The struts are integral with the body portion and fixed to the rim at angularly spaced points so as to support the rim in the position shown. Finally, it should be noted that the rim has the front edge thereof formed with a radially inwardly extending annular flange 56 that serves as a stop while the upper portion of the rear edge has a tab 58 formed thereon as best seen in FIGURE 2. The purposes of the letter construction will be more apparent as the description proceeds.

As seen in FIGURE 3 a mirror element 60 is shown retained by the mirror support between the bearing surface 38 and the flange 56 of the rim. This, of course, illustrates the mirror support and the mirror element when assembled, while FIGURES 4 through 7 illustrate the manner of inserting the mirror element into the mirror support. In this regard and with reference to the latter mentioned figures, it should be noted that the assembly would normally be done prior to placing the mirror support in the retaining housing. This would be especially true with mirror mechanisms of the remotely controlled type, since the practice is to entirely enclose the mirror support with a shield as shown in FIGURE 3. Thus, and as seen in FIGURES 5 and 6, to install the mirror element into the mirror support, the body portion of the latter would be held securely and at the same time the upper portion of the rim 46 would be tilted forwardly so as to open a gap between the rim's rear edge 50 and the bearing surface 38. This is permitted inasmuch as the rim and struts 52 and 54 are made of a flexible material such as plastic and therefore yield slightly due to the force being applied to the rim. In other words, each strut twists slightly about its longitudinal axis and, in effect, they define pivot connections for permixing the rim to be displaced. Once this gap is revealed, one edge of the mirror element can then be inserted as seen in FIGURE 6 followed by full insertion to the position of FIGURE 7. It should be noted that, as seen in FIGURES 2 and 4, the struts are located at points below the horizontal axis H–H', so that the full width of the mirror element can be accommodated within the mirror support when it is inserted into the latter. At this point the upper portion of the rim is still located forwardly of the mirror element due to the tab 58. In order to complete the assembly, the rim's front edge 48 is forcibly pushed in the direction of the arrow to cause the yieldable material of the tab to deform and snap over the edge of the mirror element to lock the latter in the position of FIGURE 3.

Should it be necessary to replace the mirror element, it should be apparent that it is a simple matter of reversing the steps explained above so that in the first instance the upper portion of the rim would be pivoted outwardly with respect to the body portion to release the locking tab. Thereafter the mirror is grasped by the figures and can be quickly removed.

Although the mirror support made in accordance with the invention is illustrated in combination with a specific mirror operating mechanism, it should be understood that this is for illustrative purposes only and that any other equivalent mechanism can be utilized therewith and for that matter the mirror can be employed with the hand-operated type rear view mirrors frequently found on present motor vehicles. The inventor contemplates that various changes and modifications can be made in this particular structure without departing from the spirit of the invention and therefore he does not wish to be limited except by the scope of the claims which follow.

I claim:

1. A support for supporting a mirror element on a base, comprising a body portion having a flat bearing surface formed on one side thereof, the opposite side of said body portion having connecting means formed therewith that are adapted to be mounted to said base for universally supporting said body portion, a rim conforming in configuration to said mirror element and having a first edge and a second edge respectively disposed in planes substantially parallel to said flat bearing surface, a pair of flexible arms radially extending from said body portion and being connected to said rim adjacent said first edge, a radially inwardly extending annular flange formed on said rim adjacent said second edge and serving as a stop means, said flexible arms being so located on the rim whereby the latter can be tilted with respect to said body portion about an axis substantially parallel to said planes to permit said mirror element to be inserted between the bearing surface and the flange.

2. A support for supporting a mirror element on a base, comprising a substantially annular body portion having a flat bearing surface formed on one side thereof, the opposite side of said body portion having connecting means formed therewith that are adapted to be mounted to said base for universally supporting said body portion, an annular rim having a first edge and a second edge respectively disposed in planes substantially parallel to said flat bearing surface, a pair of flexible arms radially extending from said body portion and being connected to said rim adjacent said first edge, a radially inwardly extending annular flange formed on said rim adjacent said second edge and serving as a stop means, said flexible arms being so located on the rim whereby the latter can be tilted with respect to said body portion about an axis substantially parallel to said planes to permit said mirror element to be inserted between the bearing surface and the flange.

3. A support for retaining a mirror element on a base, comprising a rim having a radially inwardly extending stop portion formed thereon, a body portion, connecting means formed with the rear of said body portion and adapted to be mounted to said base for universally supporting said body portion, a pair of flexible struts radially extending from the body portion with the end portions thereof secured to the rim so as to hold the latter in a spaced position concentric to the body portion, said mirror element adapted to be supported in a fixed position between the forward portion of said body portion and said stop portion, said flexible struts being located at spaced points whereby the rim can be displaced relative to the body portion to permit said mirror element to be inserted between the stop portion and the body portion, and locking means formed on the rim adjacent the stop portion and a distance therefrom equal to the thickness of the mirror so that upon full insertion of the mirror element into the support, whereby said locking means can be snapped over a portion of said mirror element to rigidly hold said mirror element in place.

4. The support of claim 3 wherein said flexible struts act as spring means for returning said rim to a normal position and are subjected to twisting about their longitudinal axis when the rim is displaced.

References Cited by the Examiner

UNITED STATES PATENTS

| | | | |
|---|---|---|---|
| 789,076 | 5/1905 | Trahan et al. | 229—92.9 |
| 1,364,902 | 1/1921 | Sullivan | 40—13 |
| 2,535,575 | 12/1950 | Hodges | 40—16 |

JEWELL H. PEDERSEN, *Primary Examiner.*

O. B. CHEW, *Assistant Examiner.*

UNITED STATES PATENT OFFICE
CERTIFICATE OF CORRECTION

Patent No. 3,313,077                                April 11, 1967

Lloyd T. Fuqua

It is hereby certified that error appears in the above numbered patent requiring correction and that the said Letters Patent should read as corrected below.

Column 1, line 45, for "miror" read -- mirror --; line 66, for "tnd" read -- end --; column 2, line 65, for "plane" read -- planes --; column 3, line 7, for "letter" read -- latter --; line 33, for "mixing" read -- mitting --; line 53, for "figures" read -- fingers --; line 60, after "mirror" insert -- support --; column 4, line 57, for "mean sfor" read -- means for --.

Signed and sealed this 7th day of November 1967.

(SEAL)
Attest:

Edward M. Fletcher, Jr.

Attesting Officer

EDWARD J. BRENNER

Commissioner of Patents